United States Patent
Hottinen

(10) Patent No.: US 6,904,109 B1
(45) Date of Patent: Jun. 7, 2005

(54) INTERFERENCE CANCELLATION METHOD, AND RECEIVER

(75) Inventor: Ari Hottinen, Vantaa (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 08/817,114

(22) PCT Filed: Oct. 6, 1995

(86) PCT No.: PCT/FI95/00553

§ 371 (c)(1),
(2), (4) Date: Apr. 7, 1997

(87) PCT Pub. No.: WO96/11534

PCT Pub. Date: Apr. 18, 1996

(30) Foreign Application Priority Data

Oct. 7, 1994 (FI) .................................................. 944739

(51) Int. Cl.⁷ .............................................. H04B 1/69
(52) U.S. Cl. ...................................... 375/346; 375/130
(58) Field of Search ........................ 327/156; 370/209, 370/342; 375/206, 285, 224, 346, 130, 140, 141, 142, 143, 144, 146, 147, 148, 149, 150, 152, 316, 324, 325, 340

(56) References Cited

U.S. PATENT DOCUMENTS

| | | | | |
|---|---|---|---|---|
| 5,136,612 A | * | 8/1992 | Bi ............................... | 370/342 |
| 5,181,209 A | * | 1/1993 | Hagenauer et al. .......... | 714/795 |
| 5,218,619 A | * | 6/1993 | Dent ............................ | 370/209 |
| 5,323,418 A | | 6/1994 | Ayerst et al. | |
| 5,327,576 A | * | 7/1994 | Uddenfeldt et al. ......... | 370/333 |
| 5,418,814 A | * | 5/1995 | Hulbert ....................... | 370/342 |
| 5,432,754 A | * | 7/1995 | Brady et al. ................. | 367/134 |
| 5,463,660 A | * | 10/1995 | Fukasawa et al. ........... | 370/342 |
| 5,539,749 A | * | 7/1996 | Eul .............................. | 370/331 |
| 5,559,757 A | * | 9/1996 | Catipovic et al. ............ | 367/134 |
| 5,790,595 A | * | 8/1998 | Benthin et al. .............. | 375/224 |
| 5,933,423 A | * | 8/1999 | Laakso et al. ............... | 370/335 |

FOREIGN PATENT DOCUMENTS

| | | | |
|---|---|---|---|
| EP | 0 391 354 | 10/1990 | |
| EP | 0 491 668 | 6/1992 | |
| EP | 0 493 904 | 7/1992 | |
| EP | 0493904 | * 7/1992 | ................. 370/342 |
| EP | 0 671 821 | 9/1995 | |
| WO | WO 92/16065 | 9/1992 | |
| WO | WO 93/22853 | 11/1993 | |

OTHER PUBLICATIONS

Lupas et al, Linear Multiuser Detectors for . . . Channels, IEEE Transactions on Information Theory, vol. 35, No. 1, Jan. 1989, pp. 123–136.

Varanasi et al, Multistage Detection in Asynchronous . . . Communications, IEEE Transactions on Communications, vol. 38, No. 4, Apr. 1990, pp. 509–519.

Brady et al, An Adaptive, Soft–Decision . . . Channels, IEEE, 1992, pp. 1137–1141.

Hoeher, TCM on Frequency–Selective Fading . . . Equalizers, IEEE Global Telecommunications Conference & Exhibition, San Diego, CA, Dec. 2–5, 1990, pp. 375–377.

Hagenauer et al., A Viterbi Algorithm with . . . its Applications, IEEE Global Telecommunications Conference & Exhibition, Dallas, TX, Nov. 27–30, pps 168–1686.

Lupas et al, Near–Far Resistance of Multiuser Detectors in Asynchronous Channels, IEEE Transactions on Communications, vol. 38, No. 4, Apr. 1990.

* cited by examiner

*Primary Examiner*—Kevin M Burd
(74) *Attorney, Agent, or Firm*—Pillsbury Winthrop LLP

(57) ABSTRACT

An interference cancellation method and a receiver operating according to the method, in which multiple access interference cancellation of a received signal is performed and a confidence coefficient for estimates obtained from the received signal is calculated. In order to effect a reliable interference cancellation, the receiver utilizes the calculated confidence coefficients to control the multiple access interference cancellation.

3 Claims, 1 Drawing Sheet

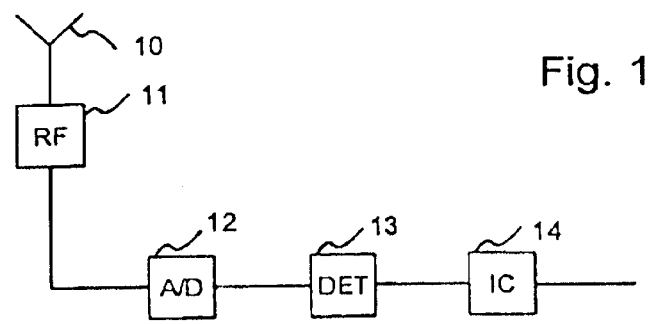
Fig. 1
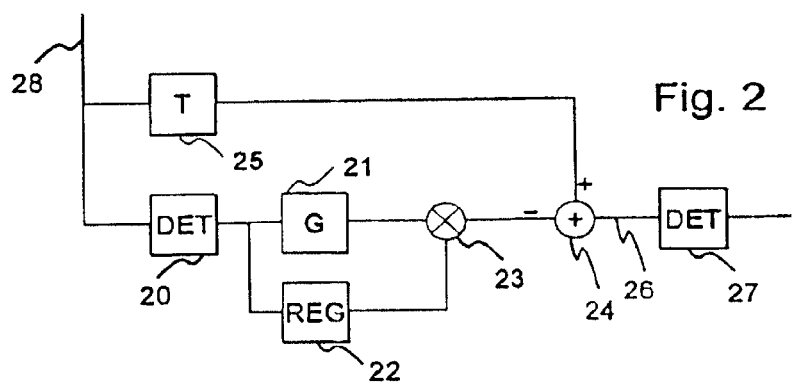
Fig. 2
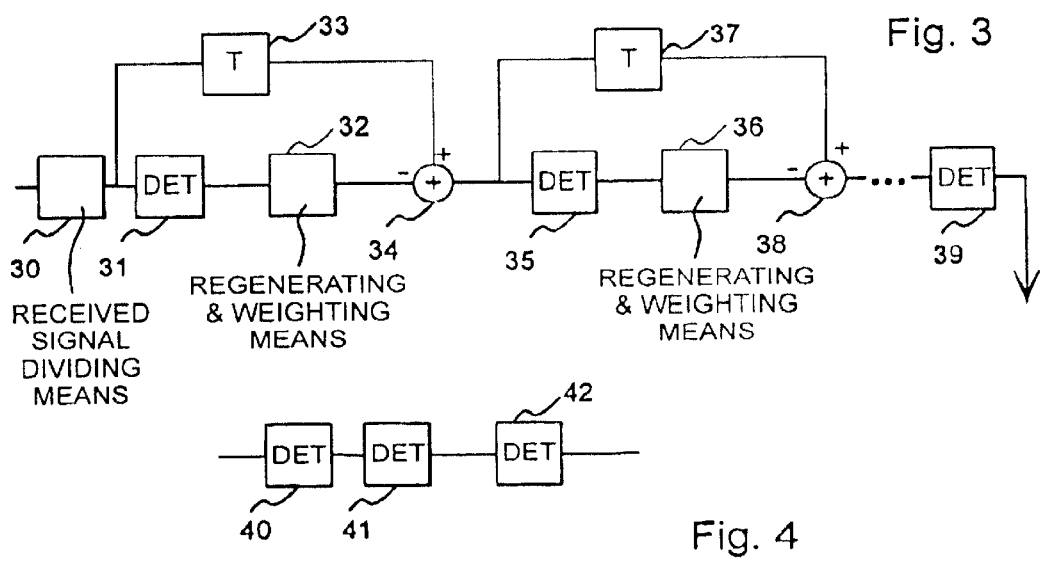
Fig. 3
Fig. 4

INTERFERENCE CANCELLATION METHOD, AND RECEIVER

This application is the national phase of international application PCT/FI95/00553 filed Oct. 6, 1995 which designated the U.S.

BACKGROUND OF THE INVENTION

The present invention relates to an interference cancellation method in a data transmission system which utilizes a multiple access interference cancellation method in which estimates of interfering signals are subtracted from the desired signal, and in which method a confidence coefficient is calculated for the estimates obtained from the received signal.

In the design and implementation of data transmission methods, an essential problem is simultaneous transmission and reception of signals of several simultaneous users, so that the signals cause as little interference to each other as possible. Owing to this fact and the available transmission capacity, several different transmission protocols and multiple access methods have been developed, the most common of which in particular in mobile communication are the FDMA and the TDMA methods, and lately also the CDMA method.

The CDMA (Code Division Multiple Access) system is a multiple access method which is based on spread spectrum technology and whose application in cellular communication systems has lately been initiated along with the earlier FDMA (Frequency Division Multiple Access) and TDMA (Time Division Multiple Access) technologies. The CDMA technology has several advantages over the earlier methods, such as simplicity of frequency planning and spectral efficiency.

In a CDMA method, the narrow-band data signal of the user is multiplied by a spreading code of much wider bandwidth to a relatively wide traffic channel band. In the known experimental cellular network systems, the bandwidths used on traffic channels include, for example, 1,25 MHz, 10 MHz and 25 MHz. In the multiplying process, the data signal spreads to the whole band used. All users transmit simultaneously by using the same frequency band. A separate spreading code is employed for each connection between a base station and a subscriber terminal equipment, and the signals from the users can be identified from each other in the receivers on the basis of the spreading code of each connection. An attempt is made for choosing the spreading codes so that they are mutually orthogonal, i.e. they do not correlate with each other.

Correlators or adapted filters in CDMA receivers implemented in a conventional way are synchronized with the desired signal, which is identified on the basis of the spreading code. The data signal is returned in the receiver onto the original band by multiplying it by the same spreading code as in the transmission phase. The signals which have been multiplied by some other spreading code neither correlate nor return to the narrow band in an ideal case. They thus appear as noise from the point of view of the desired signal. The aim is thus to detect the signal of the desired user among several interfering signals. In practice, the spreading codes are not non-correlated, and the signals of other users complicate the detection of the desired signal by distorting the received signal. This interference caused by the users for each other is termed as multiple access interference.

A data transmission method employing TDMA multiple access system has several frequencies in use, each of which is divided into time slots in which the signals of the various users have been placed. Thus, each user has a time slot of his own. As the frequency range reserved for the system is usually limited, the same frequencies must be used in cells located a certain distance away. If high frequency efficiency is desired, this distance should be kept as small as possible. This results in different transmissions on the same frequencies interfering with each other. Consequently, an interfering signal is heard in the receiver in a certain time slot in addition to the desired signal, which interfering signal originates in some other connection using the same frequency.

The single user detection method described above in connection with CDMA is not optimum because, in connection with the detection, it disregards information contained in the signals of other users. In addition, the conventional detection is unable to correct errors caused partly by unorthogonal spreading codes and signal distortion on the radio path. An optimum receiver takes into consideration the information contained in the signals of all the users, and thus the signals can be detected in an optimum manner by using, for example, a Viterbi algorithm. In the CDMA system, for example, an advantage of this detection method is that the situation, as far as the receiver is concerned, resembles a single user CDMA system in which the multiple access problem does not exist. For example, the near-far problem, typical for CDMA systems, does not occur. The term near-far problem refers to a situation where a transmitter close to the receiver covers the transmitters further away by its transmission. The most serious weakness of the Viterbi algorithm is that the computational capacity it requires increases exponentially as the number of users increases. For example, a system of ten users in which the bit rate is 100 kbit/s by QPSK modulation would require 105 million arithmetical operations per second for calculating the Viterbi algorithm. In practice, this constitutes a bar to the implementation of an optimum receiver.

However, it is possible to approximate an optimum receiver by various methods. The prior art knows different kinds of methods for multiuser detection (MUD). The best-known methods include a linear multiuser detection, a decorrelating detector and a multistage detector. These methods are examined in closer detail in the references Varanasi, Aazhang: Multistage detection for asynchronous code division multiple access communications, IEEE Transactions on communications, vol. 38, pp. 509–519, April 1990, Lupas, Verdu: Linear multiuser detectors for synchronous code-division multiple access channels, IEEE transactions on Information Theory, vol 35, no. 1, pp 123–136, January 1989, and Lupas, Verdu: Near-far resistance of multiuser detectors in asynchronous channels, IEEE Transactions on communications, vol 38, April 1990. However, these methods are also associated with operations, such as matrix inversion operations, requiring a lot of computational capacity.

A second way for solving the problems caused by the multiple access interference is to use interference cancellation (IC) methods. In IC type solutions, the purpose is to detect the users one by one, often in order of magnitude, so that the influence of the signals of users already detected is eliminated from the received signal prior to detection of the subsequent user. As an example of such a solution, reference is made to the European patent publication 491668, applying the method described above in the CDMA cellular mobile communication system. The interference cancellation methods are computationally more efficient than the algorithms of the MUD type, but their performance is weaker particularly during poor reception conditions, such as a fading multipath channel, often having low signal levels.

Multiple access interference cancellation methods similar to the ones described above can also be applied to TDMA systems. They do, however, have the deficiency of a deteriorating performance in case the interfering signals have bad estimates. In the worst case, multiple access interference cancellation may even increase interference, if the interfering signals are subtracted on the basis of wrong estimates.

BRIEF SUMMARY OF THE INVENTION

It is the purpose of the present invention to implement an interference cancellation method by means of which the aforementioned problems can be avoided, and which does not make the receiver substantially any more complicated, and which can be applied to both the TDMA and CDMA multiuser methods.

This object is achieved by a method set forth in the introduction, which method is characterized in that confidence coefficients calculated for the estimates of the interfering signals are utilized in the multiple access interference cancellation method.

In addition, the invention relates to a receiver of a data transmission method, which receiver comprises means is for carrying out multiple access interference cancellation to the received signal, and means for calculating a confidence coefficient for the estimates obtained from the received signal. The receiver of the invention is characterized in that it comprises means for utilizing in the multiple access interference cancellation the confidence coefficients calculated for the estimates of the interfering signals.

Thus, the basic idea of the invention is to take into account the confidence coefficient of the estimate of the interfering signal prior to carrying out interference cancellation. Each estimated symbol can be weighted by a confidence coefficient which is calculated separately and which obtains values within the range 0 . . . 1. Unreliable interference estimates may be disregarded, because their subtraction from the signal might even increase interference. Consequently, the interference cancellation method achieves better results when those interference estimates that correspond well with the actual interference are cancelled. Furthermore, a signal having a low confidence coefficient can be omitted from further processing, for example from the latter stages of a multistage receiver, which results in a simpler structure and an increase in computational efficiency.

Confidence coefficients have earlier been utilized in other parts of the receiver, and in using a Viterbi decoder, for example, they are calculated in association with detection, as well as, for example, in source decoding which has utilized coefficients calculated in channel decoding. Of earlier targets of application for confidence coefficients, reference can be made to: U.S. Pat. No. 5,181,209, J. Hagenauer, P. Höher: A Viterbi algorithm with soft decision outputs, Proc. of IEEE Globecom 1989, Dallas, Tex., and P. Höher: TCM on frequency selective fading channels: comparison of soft output probabilistic equalizers, Proc. of IEEE Globecom 1990. The term soft output is in some publications used in a different sense than in this application. This application uses said term to refer to a confidence coefficient of grouping while, for example, the publication D. Brady, J. Catipovic: An adaptive soft-decision multiuser receiver for underwater acoustical channels, 26th Asilomar Conference on Signals, Systems & Computers, 1992 uses it in reference to heuristic scaling.

The method according to the invention enables, due to the more efficient interference cancellation, a narrower frequency re-use spacing in TDMA systems, for example, which in turn increases system capacity.

BRIEF DESCRIPTION OF THE SEVERAL VIEWS OF THE DRAWING

In the following, the invention will be described in closer detail with reference to the examples of the accompanying drawings, in which FIG. 1 is a block diagram illustration of the structure of a receiver according to the invention, FIG. 2 illustrates in closer detail, by means of a block diagram, the implementation of interference cancellation method according to the invention, FIG. 3 shows, by means of a block diagram, an alternative structure of a receiver according to the invention, and FIG. 4 illustrates the structure of a multistage receiver.

DETAILED DESCRIPTION OF THE INVENTION

The confidence coefficient in this invention is associated with detected symbols. It depends on the distribution of the received signal, which distribution in turn depends on, among other things, the symbol alphabet, transmission path and signal processing within the receiver. The distribution of the received signal particularly depends on the strength of multipath propagated signals, channel status, and correlations between the received symbols. In CDMA systems, interference cancellation methods are above all based on optimum or sub-optimum decision rules which take into account the correlations between the symbols of the various users.

The confidence coefficient can be generated by means of, for example, maximum a posterior (MAP) or MUSE criteria. Typically, the detection confidence is judged by estimating the probability of an erroneous decision:

$$P_{ER} = Prob(\hat{S} \neq S_k | r),$$

in which $S_K$ denotes the symbol transmitted, $\hat{S}$ is the estimated symbol and r the signal supplied to the detector. The symbols are naturally defined by a way appropriate for the application. It is, however, included in the symbol alphabet generally used in the transmitter. It may also describe a multidimensional symbol vector whose kth coordinate is included in the symbol alphabet of the kth user. Generally speaking, then, the confidence coefficient is a function of the distribution of detected symbols or parameters of the distributions.

The received low-pass filtered signal can generally be represented by the equation $$r_{m,n}(t) = S_n \sum_{k=-\infty}^{\infty} x_{n,k} q_{m,n}(t - kT) + n_{m,n}(t),$$

in which T is the duration of the signal, $X_{n,k}$ is the source symbol of the nth user at the moment of time k, and $$q_{m,n}(t) = c_T(t-t_n) \otimes h_{m,n}(t) \otimes c_R(t)$$

is the convolution of the impulse responses or the transmitter filter, multipath channel and receive filter, respectively, on the mth diversity branch from the nth source. The total signal received by the mth diversity branch is then $$r_m(t) = \sum_{n=0}^{N} r_{m,n}(t) + n_m(t),$$

in which $n_m(t)$ denotes noise. In the simplest case m=1.

It is assumed without effecting generality that the index of the desired user is zero, n=0. The method can correspondingly be applied to the other users. The interfering signal components are divided into two parts, the dominant components Nd and noise components Nn, and N Nd+Nn. In the receiver, attempt is made for removing the influence of the dominant noise components. The noise components comprise those interfering signal components that are weak as to their strength, and whose effect in the interference cancellation may be ignored by considering them as noise-like interference. The total signal illustrated in the formula above can be shown in the form $$r_m(t) = r_{m,o}(t) + \sum_{n=1}^{Nd} r_{m,n}(t) + \sum_{n=Nd+1}^{N} r_{m,n}(t) + n_m(t)$$

$$= r_{m,o}(t) + I_{Nd} + I_{Nn} + n_m(t),$$

in which $I_{Nd}$ comprises the sum signal of the dominant interfering signal components and $I_{Nn}$, the sum of interference components classified as noise components. In the receiver, detection is desired of the transmitted symbols $x_{n,k}$ from the received signal, which is illustrated above. If the interference components $I_{Nd}$ and $I_{Nn}$ are small, the reception can be carried out by conventional single user reception methods, as is done in the GSM system, for example. As the co-channel interference increases as a result of reducing frequency re-use distances, more efficient methods will be required.

In the preferred embodiment of the method according to the invention, interference cancellation is carried out by subtracting from the desired signal the estimates of the dominant interfering signal, the estimates being weighted by the confidence coefficient of the estimates. The calculation for the estimates of the dominant interfering signal can be represented by $$\hat{I}_{Nd} = \hat{s}_n \Sigma \hat{x}_{n,k} \hat{q}_{m,n}(t-kT) g_{n,k}$$

where $g_{n,k}$ is the confidence coefficient of the estimate of the interfering signal, and $$\hat{q}_{m,n} = c_t(t - \hat{t}_m) \otimes \hat{h}_{m,n}(t) \otimes c_t(t)$$

is the convolution described earlier, where $\hat{h}_{m,n}$ and $\hat{t}_m$ are channel estimates.

The method can in a simple way be applied by, for example, detecting the symbols of all the dominant interfering signals and calculating a confidence coefficient for the estimates according to how accurate the obtained estimate is considered to be. Following this, the interfering signal is regenerated, multiplied by the confidence coefficient and subtracted from the received transmission. The confidence coefficient may obtain values between the range [0,1] so that if the estimate is considered as unreliable the coefficient value is close to zero, and if the estimate is considered as reliable the coefficient value is close to one. If all the interference estimates have a high confidence coefficient, it is possible to cancel the interference almost entirely, but if they all have a low confidence coefficient there is practically no interference cancellation at all. This way it is possible to avoid a situation where an interference calculated on the basis of a wrong estimate is subtracted from the signal, leading in fact to an increase in interference. In the solution according to the invention, the operation of the receiver automatically alternates between that of a single user receiver and an interference cancellation receiver depending on confidence coefficients obtained at any given moment of time.

The confidence coefficient may be calculated, for example, in association with a channel decoder. If a Viterbi decoder is employed by the receiver, the confidence coefficient is obtained without any additional procedures, because it is calculated anyway and utilized in enhancing the operation of the source decoder.

The method according to the invention can also be applied to a multistage receiver structure in which interference cancellation method utilizing confidence coefficients according to the invention is applied to the first or latter stages. On every cycle of multistage detection, a number of interference terms are separately estimated, which interference terms are subtracted from the received signal according to, for example, the following formulas, again assuming that n=0:

$$\hat{I}_{Nd}^{(i)} = \hat{s}_n^{(i)} \Sigma \hat{x}_{n,k}^{(x)}(t-kT) g_{n,k}^{(i)}$$

$$r_m(t)^{(i)} = r_{m,o}(t) + I_{Nd} + \hat{I}_{Nd}^{(i)} + n_m(t)$$

in which symbols $\hat{x}_{n,k}^{(i)}$, $\hat{q}_{m,n}^{(i)}$ defining channel parameters and the confidence coefficients $\hat{g}_{n,k}^{(i)}$ have been estimated by the desired method from the signal $\hat{I}^{(i-1)}$. Typically, initial values are at first estimated for the channel parameters $\hat{q}_{m,n}^{(0)}$, which are used in detection of symbols $\hat{x}_{n,k}^{(0)}$. At the initial stage these variables are estimated from the signal subject to interference, which results in their reliability being typically bad.

In the estimation, a training sequence can be utilized, i.e. a known symbol sequence in the received signal, improving the performance of channel estimation. Thereby, as the symbols are known, it is possible to a priori set the confidence coefficient value to 1.

As soon as $\hat{q}_{m,n}^{(i)}$ has been calculated, the symbols $\hat{x}_{n,k}^{(i)}$ can be detected by using the selected decision rule for the selected symbol alphabet. The symbol alphabet may, for example, be BPSK, QPSK or some other multidimensional sequential signal. In the CDMA system, $\hat{x}_{n,k}^{(i)}$ may, for example, be a modulated spreading sequence.

FIG. 1 is a block diagram illustration of the structure of a receiver according to the invention. The receiver of the invention illustrated in the figure comprises an antenna 10 by means of which the received signal is fed to the radio frequency parts 11 in which the radio frequency signal is transferred onto an intermediate frequency. From the radio frequency parts, the signal is fed to an analog/digital converter 12 in which the received analog signal is converted to digital form. The converted signal is further fed to a detection means 13 in which estimates of the received signal are detected for the received symbols. In the receiver according to the invention, the confidence coefficient for the detected symbols is also calculated in the means 13. The estimates and the calculated confidence coefficients are further fed to an interference cancellation means 14 in which, according to the preferred embodiment of the invention, the interference estimates are multiplied by the confidence coefficient and subtracted from the desired signal. The purged signal is further fed to the other parts of the receiver. The receiver of the invention can be used in both the base station and the subscriber end terminal in a cellular mobile communication system. Naturally, the receiver according to the invention also comprises other components than those described above, such as filters and amplifiers.

The interference cancellation according to the invention can advantageously be carried out in a detection-interference cancellation block of FIG. 2 stage by stage. The received signal 28, which has been converted into digital form, is fed to the detection means 20 in which initial estimates are calculated for the received signals. In means 21, a confidence coefficient is calculated for the estimates, the value of which confidence coefficient describes how well the estimate is assumed to represent the transmitted symbol. The detected signals are regenerated again in means 22, after which the regenerated signals are multiplied by corresponding confidence coefficients in a multiplying means 23. Following this, the interfering signals that have been regenerated and weighted by coefficients are fed as a negative input to a summing means 24 whose second, positive, input is the original received signal delayed by delay means 25, and in which summing means 24 the weighted interfering signals are subtracted from the original transmission. Thus, the purged signal 26 is further fed to the second detection means 27 in which the desired signal is estimated again.

FIG. 3 illustrates a second possible way to implement a receiver according to the invention. The receiver of the figure comprises means 30 by which the received signals are divided in several groups each comprising at least two signals. The receiver further comprises detection means 31, 35, 39 for carrying out in each group a simultaneous detection for the signals from the received transmission by any known multiuser detection method. In detection means 31, 35, 39 a confidence coefficient is calculated for the detected signals. Said calculating means can be comprised in connection with said detection means or separate from them. The receiver also comprises means 32, 36, each for regenerating the detected signals again and multiplying the signals by the corresponding confidence coefficients. Each of means 32, 36 is constituted by an assembly identical to means 21, 22 and 23 of FIG. 2. The group detection means 31, 35, 39 have been grouped so that each group is consecutively detected so that in the summing means 34, 38 of the receiver it is possible to subtract the signals from means 32 and 36, respectively, weighted by the confidence coefficients of the groups already detected from the received transmission delayed by delay means 33 and 37 respectively prior to detecting the subsequent group. A receiver structure utilizing the group detection illustrated above is in closer detail described in the Finnish patent application 943196 which is herein incorporated as reference.

FIG. 4 illustrates the structure of a multistage receiver by means of a block diagram. The multistage receiver comprises several detection stages 40, 41, 42 commonly connected in series. In such a case, the latter detection stages utilize the detection carried out already at the earlier stages, especially as interference cancellation is being carried out. In the multistage receiver of the invention, one of the earlier detection stages 40, 41, 42, at least, comprises the means 14, described above, to utilize in the multiple access interference cancellation confidence coefficients calculated for the estimates of the interfering signals.

Although the invention is above described with reference to the examples of the attached drawings, it is obvious that the invention is not restricted to them, but it may be varied within the inventive idea of the attached claims.

For example, the signal regenerated in the CDMA systems is narrow-band if it is subtracted from a narrow-band signal. Generally speaking, regeneration and subtraction should be matched to the method used for processing the received signal in the receiver prior to the interference cancellation utilizing confidence coefficients according to the invention.

What is claimed is:

1. A method for canceling signal interference in a TDMA data transmission system, comprising:

calculating estimates of interfering signals in the TDMA data transmission system;

subtracting the estimates of the interfering signals from a desired signal;

calculating a confidence coefficient in a soft-output channel decoder in the TDMA data transmission system, the confidence coefficient having a value in a range greater than 0 and less than 1, for the estimates of the interfering signals based on a received signal;

forming an estimate of each interference signal as a product of a channel estimate and output of the soft-output channel decoder;

subtracting the formed estimates from the received signal;

dividing received signals into several groups in a receiver, each group comprising at least two signals; and carrying out in each group simultaneous detection of the signals from a received transmission;

wherein each group is detected consecutively;

wherein the signals of groups already detected are regenerated and subtracted from the received transmission prior to detecting a subsequent group;

wherein the signals detected prior to the subtraction from the received transmission are weighed by a confidence coefficient calculated for each received signal.

2. A receiver of a TDMA data transmission system, comprising:

means for carrying out multiple access interference cancellation for a received signal in the TDMA data transmission system;

means for calculating a confidence coefficient in a soft-output channel decoder in the TDMA data transmission system, the confidence coefficient having a value in a range greater than 0 and less than 1, for estimates of the received signal;

means for calculating confidence coefficients for estimates of interfering signals;

means for forming an estimate of each interference signal as a product of a channel estimate and output of the soft-output channel decoder;

means for dividing received signals into several groups, each comprising at least two signals;

means for carrying out, in each group, a simultaneous estimation and detection for the signals from a received transmission and for consecutive detection of each group;

means for regenerating the signals of groups already detected and for weighing the signals already detected by a confidence coefficient calculated for each of the received signals;

means for subtracting the weighted estimates from the received signal; and means for subtracting the signals of groups already detected from the received transmission prior to detection of a subsequent group.

3. A receiver of a TDMA data transmission system, comprising:

a multiple access interference cancellation mechanism to carry out multiple access interference cancellation for a received signal in the TDMA data transmission system;

a confidence coefficient calculating mechanism to calculate a confidence coefficient in a soft-output channel decoder in the TDMA data transmission system, the confidence coefficient having a value in a range greater than 0 and less than 1, for estimates of the received signal;

a utilizing mechanism to utilize the confidence coefficient calculating mechanism to calculate confidence coefficients for estimates of interfering signals;

a forming mechanism to form an estimate of each interference signal as a product of a channel estimate and output of the soft-output channel decoder;

a signal dividing mechanism to divide received signals into several groups each of which comprises at least two signals;

a signal estimating and detecting mechanism to carry out in each group a simultaneous estimation and detection for the signals from a received transmission and to consecutively detect each group;

a signal regenerating and weighing mechanism to regenerate the signals of groups already detected and to weigh the signals already detected by a confidence coefficient calculated for each of the received signals;

a signal subtracting mechanism to subtract the signals of groups already detected from the received transmission prior to detection of a subsequent group; and a subtracting mechanism to subtract the weighted estimates from the received signal.

* * * * *